(12) United States Patent
Frederick

(10) Patent No.: US 7,106,360 B1
(45) Date of Patent: Sep. 12, 2006

(54) METHOD FOR DISTRIBUTING SPORTS ENTERTAINMENT

(75) Inventor: Paul J. Frederick, Rockville, MD (US)

(73) Assignee: U'R There! Entertainment, Ltd., Springfield, VA (US)

(*) Notice: Subject to any disclaimer, the term of this patent is extended or adjusted under 35 U.S.C. 154(b) by 568 days.

(21) Appl. No.: 09/452,952

(22) Filed: Dec. 2, 1999

Related U.S. Application Data

(60) Provisional application No. 60/152,087, filed on Sep. 2, 1999, provisional application No. 60/148,072, filed on Aug. 10, 1999.

(51) Int. Cl.
*H04N 7/18* (2006.01)

(52) U.S. Cl. .................. 348/157; 348/143; 348/148

(58) Field of Classification Search ................ 348/157, 348/143, 7, 148, 149, 61; 386/95; 709/224; 725/141, 138
See application file for complete search history.

(56) References Cited

U.S. PATENT DOCUMENTS

| | | | | |
|---|---|---|---|---|
| 5,068,733 A | * | 11/1991 | Bennett ............................ | 348/7 |
| 5,565,908 A | * | 10/1996 | Ahmad ............................ | 348/7 |
| 5,570,126 A | * | 10/1996 | Blahut et al. ................... | 348/7 |
| 5,600,368 A | * | 2/1997 | Matthews, III ............... | 348/143 |
| 5,675,510 A | * | 10/1997 | Coffey et al. ................ | 709/224 |
| 5,729,471 A | * | 3/1998 | Jain et al. ..................... | 725/131 |
| 5,793,872 A | * | 8/1998 | Hirayama et al. ............. | 386/95 |
| 5,894,320 A | * | 4/1999 | Vancelette ...................... | 348/7 |
| 5,931,908 A | * | 8/1999 | Gerba et al. ................. | 709/219 |
| 6,002,995 A | * | 12/1999 | Suzuki et al. ............... | 702/188 |
| 6,578,203 B1 | * | 6/2003 | Anderson et al. ........... | 725/141 |

OTHER PUBLICATIONS

NASCAR Racing video game manual by PAPYRUS, 1994-1995, Papyrus Design Group, Inc., pp. 23-24.*

* cited by examiner

*Primary Examiner*—Allen Wong
(74) *Attorney, Agent, or Firm*—Venable LLP; Clifton E. McCann; Thomas G. Wiseman

(57) ABSTRACT

A method for distributing sports entertainment includes the step of providing a plurality of video cameras positioned on vehicles or athletes that are participating in sporting events, transmitters for transmitting information from the plurality of cameras to a processing station, retransmission equipment for directing the camera feed from each of the plurality of cameras to separate channels for distribution and remote viewing at viewers' locations, and channel selectors that permit viewers to select from among the various channels, thereby allowing the viewers to select from the plurality of camera feeds. The cameras are simultaneously operated during the sporting event so as to generate a plurality of camera feeds during the event, each feed reflecting the perspective of an individual participant. The plurality of feeds is received by the retransmission equipment and retransmitted to selectable channels, each channel being associated with a respective camera feed. A viewer is thus allowed to select from the plurality of channels to thus enable his or her viewing of the sports event through the perspective of the participant of greatest interest to the viewer.

10 Claims, 2 Drawing Sheets

METHOD FOR DISTRIBUTING SPORTS ENTERTAINMENT

CROSS REFERENCE TO RELATED APPLICATIONS

This application claims the benefit of U.S. Provisional Application No. 60/148,072, filed Aug. 10, 1999 and U.S. Provisional Application No. 60/152,087 filed Sep. 2, 1999.

BACKGROUND OF THE INVENTION

I. Field of the Invention

This invention pertains to a method and related system for distributing sports entertainment.

II. Description of Related Art

Motorsports entertainment is one of the fastest growing fields of sports entertainment. Motorsports entertainment programs have long been produced and distributed to viewers remote from the site of the motorsports event through traditional means. Motorsports entertainment programs are typically produced through use of cameras stationed at various sites along the path taken by race cars or other motor vehicles. The producer selects camera feed to compile a program that is broadcast to all remote viewers.

In more recent years, producers have installed additional cameras that travel with the race cars or other participating vehicles. The cameras are mounted on various locations of the vehicles, and in some cases, are mounted on the helmets or other parts of the drivers' racing apparel. In various embodiments, the cameras are mounted on the exterior or within the interior of the vehicle, on the exterior or interior of a participant's helmet, or on the participant him or herself. The cameras are lightweight and durable so as to endure vibrations transmitted from the vehicles, and so as not to unduly interfere with the vehicles' performance. Stabilizing systems are provided so that the cameras record and/or broadcast stabilized views of the vehicle's environs.

The pictures taken by the vehicle-mounted cameras are transmitted to a receiving station by transmitting equipment carried by the vehicles and receiving equipment positioned at a receiving station. At the receiving station, the feed from the vehicle-mounted cameras becomes available to the producer, along with feed from the several other cameras that may be stationed along the track. The motorsports entertainment program is still compiled by the producer, who decides which of the various feeds is of interest at any particular point in time during the course of the motorsports event. Producers traditionally compile motorsports entertainment programs such that the feed from several different cameras are combined over the course of the event, wherein only a small portion of the program consists of feed from any particular vehicle.

The motorsports entertainment program is typically transmitted to viewers through network, cable, or satellite television transmissions as it is being produced. The remote viewer receives the program by selecting a designated channel, and the program received by the viewer is the same as the program as prepared by the producer. As such, the viewer is constrained by the feed selections that have been made by the producer, and has no ability to select the feed from a vehicle-mounted camera of particular interest to the viewer. The viewer's only choice is to watch or not watch the program as it has been produced.

The traditional prior art means of providing motorsports entertainment unduly constrains the viewer and prevents viewers from observing aspects of the motorsports entertainment event that are of particular interest. Many motorsports enthusiasts have a race car driver of primary interest, and would be primarily interested in viewing the motorsports event from the standpoint of the particular driver. For this large segment of the viewing public, the primary interest in viewing a particular event is not to view various positions of the track or view the track from the perspective of a variety of vehicles, but would be to view the track from the perspective of the driver of interest. Through this perspective, the viewer would be able to virtually ride with the driver of interest, experiencing the track and track conditions as viewed by the driver, experiencing the positioning of the driver's vehicle in relation to competing vehicles, and experiencing the excitement of the race from the perspective of the driver of greatest interest. The viewer would also be able to experience the interest and excitement first hand of events impacting the driver, such as near collisions, pit stops, and the like.

Other sports entertainment programming shares attributes of motorsports entertainment and is traditionally distributed in ways similar to that discussed above. However, as in motorsports entertainment, the distribution of these other sports entertainment events fails to provide viewers with the ability to select camera feed of greatest interest and excitement to the viewer. Thus, prior art methods have likewise been deficient in connection with the distribution of sporting events in the nature of a wide variety of sporting events, including but not limited to skiing, sledding events, horse racing, harness racing, football games, and the like. The present invention has applications in the distribution of those kinds of sports entertainment programming as well.

It is accordingly an object of the present invention to provide improved methodology for the distribution of motorsports entertainment programming and similar sports programs, wherein viewers are able to select vehicle-mounted or other participant-mounted camera feed of primary interest and excitement to the individual viewer.

It is a further object of the invention to provide a convenient and more efficient way of presenting advertising to viewers of sports programming.

It is a still further object of the present invention to provide a more efficient means for generating and assessing viewer purchases of sports entertainment programming.

BRIEF SUMMARY OF THE INVENTION

The present invention involves a system that includes a plurality of video cameras positioned on vehicles or athletes that are participating in sporting events, transmitters for transmitting information from the plurality of cameras to a processing station, retransmission equipment for directing each camera feed from each of the plurality of cameras to a separate channel for distribution and remote viewing at the viewers' locations, and selectors that permit viewers to select from among the various channels, thereby allowing the viewers to select from the plurality of camera feeds.

In practicing the distribution method of the invention, the plurality of cameras are simultaneously operated throughout the sporting event so as to generate a plurality of camera feeds throughout the event, each feed reflecting the perspective of an individual participant. The plurality of feeds is transmitted to the processing station and retransmitted as selectable channels, each channel being associated with a respective camera feed. The viewer selects from the plurality of channels to thus enable his or her viewing of the sports event through the perspective of the participant of greatest interest and excitement to the particular viewer.

DESCRIPTION OF THE PREFERRED EMBODIMENTS

Figure 1:
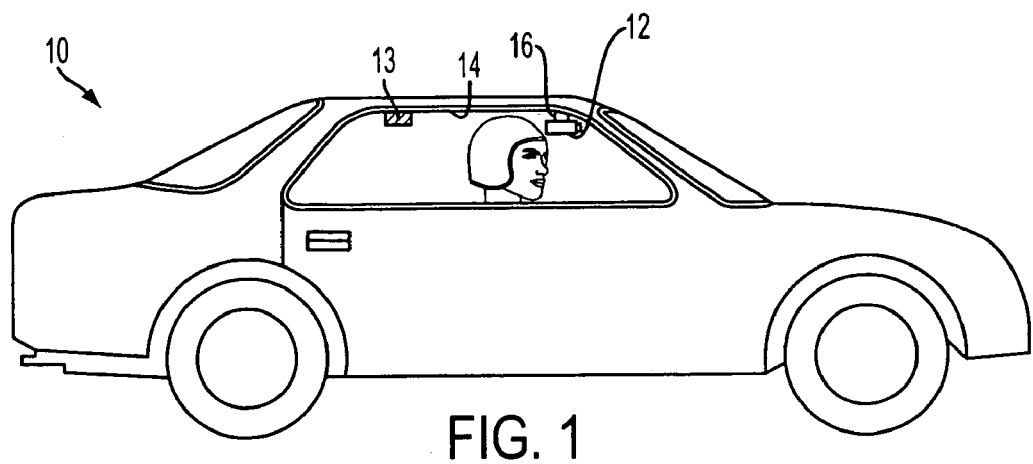
FIG. 1 is an elevational view of a race car participant in a motorsports entertainment event.

In accordance with a preferred embodiment of the present invention, FIG. 1 depicts a participant in a motorsports event. The participant is seated in a race car 10 in which camera 12 is attached to the vehicle roof 14. Camera 12 is lightweight and durable, so as to endure vibrations transmitted from the vehicle, and so as not to unduly interfere with the vehicle's performance. The camera is provided with a stabilizing system so that the camera provides stabilized views from the vehicle. In a preferred embodiment, the camera is equipped with directional motors 16 that can be operated by the participant or can be operated remotely by others, so as to enable a desired repositioning of the camera throughout the motorsports event. The camera is preferably equipped with a microphone and the camera is wired to a transmitter 13 to transmit video and audio information from the camera to a remote receiving station.

Figure 2:
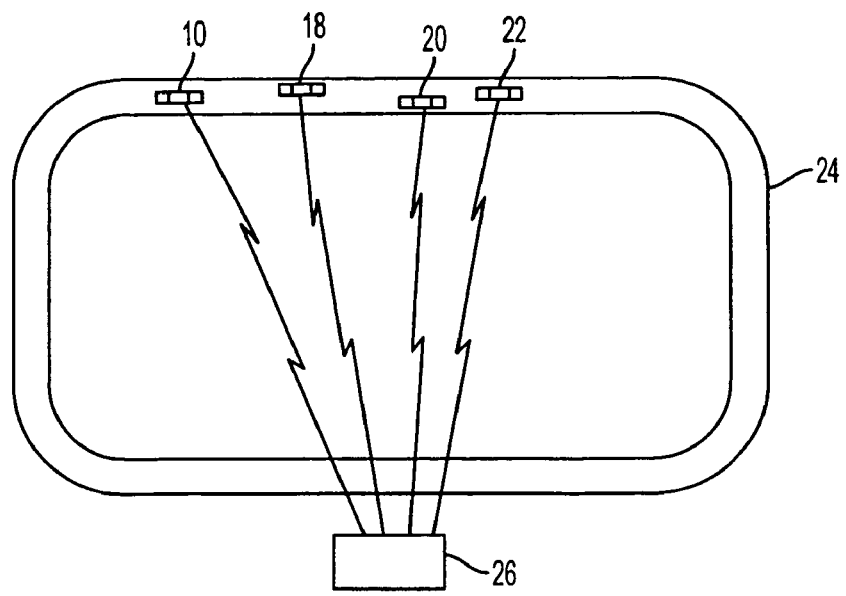
FIG. 2 is a plan view of a track used in a motorsports entertainment event.

As illustrated in FIG. 2, vehicle 10 and other participating vehicles 18, 20 and 22 proceed around a track 24 during the course of the motorsports event. Each of the participating vehicles is equipped with a camera similar to camera 12 of FIG. 1, and each camera is wired to a transmitter similar to transmitter 13. As the vehicles proceed around track 24, data generated by the cameras is transmitted by transmitters 13 to receiving station 26. The cameras are operated throughout the motorsports event, providing substantially continuous feed to the receiving station from the environs of each of the participating vehicles.

Figure 3:
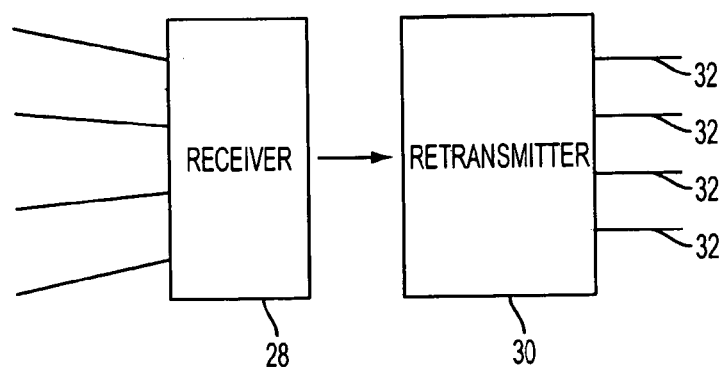
FIG. 3 is a schematic view of equipment at a processing station in accordance with the invention.

FIG. 3 schematically illustrates equipment and operations at the receiving station in a preferred embodiment of the invention. Receiver 28 receives data transmitted from the vehicle-mounted cameras and delivers the information to retransmitter 30. Retransmitter 30 operates in conventional fashion to convert the data, as may be necessary, and direct information representing the plurality of camera feeds to respective channels 32 of a distribution system. In an alternative embodiment, a converter is provided at viewers' locations or between the receiving station and the viewers' location and allows a conversion of data from receiver 28 to data that generates images and sound at viewers' televisions, monitors or other audiovisual equipment. The distribution system may be in the form of a pay-per-view television system or an Internet-type of computer distribution system, and may involve signal transmission by cable or telephone lines or by electrical waves.

Figure 4:
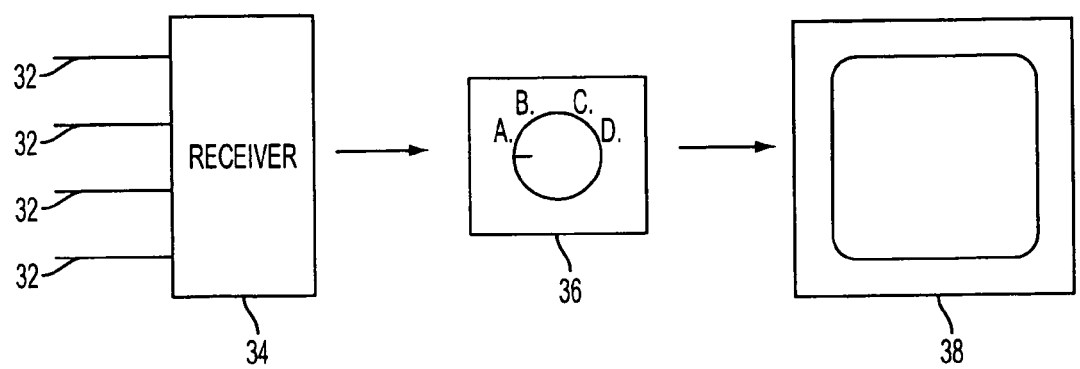
FIG. 4 is a schematic illustration of equipment used by a viewer in accordance with the invention.

Equipment at the site of a viewer is schematically illustrated in FIG. 4. Information representing the plurality of camera feeds is received via respective channels 32 by receiver 34. Selector 36 is operable by the viewer to select from among the various channels that are available. As necessary, receiver 34 also converts the signal received from channels 32 to a signal that generates an image on screen 38. In this fashion, the image appearing on screen 38 is the image captured by the camera associated with the camera of the participant that is of greatest interest to the viewer.

In the preferred embodiment, the equipment at a viewer's station is in the nature of pay-per-view television or in the nature of computer equipment equipped with Internet or other computer network access. Channels 32 are in the nature of pay-per-view channels when the viewer's equipment is in the nature of pay-per-view television. Channels 32 are in the nature of one or more signal transmissions over the Internet when the viewer's equipment is in the nature of computer equipment. Selector 36 is a channel selector in the case of pay-per-view television and is preferably in the nature of a key-selected or mouse-selected option in the case of a computer. In other embodiments, a viewer selects between channels by telephoning or otherwise informing the distributor, who then enables the viewer to receive information representing the view from the camera of choice.

In a further embodiment, the invention allows the viewer to select between camera feed from the perspective of a participant of particular interest, on the one hand, and camera feeds from the perspectives of other participants, or the combination of camera feeds that are selected and incorporated in a standard viewing program of the motorsports event, composed of images selected by the producer, on the other. In a still further embodiment, the viewer is provided a split-screen option, whereby the camera feed from the perspective of the participant of interest is viewed in one part of the screen, while the view from other cameras, optionally in the form of the producer's standard programming of the motorsports event, appears in another portion of the screen. In a still further embodiment, audio and video feeds are selectively receivable by the viewer such that a viewer can select a sound feed from one camera and a video feed from another.

Payment for and control of receipt of desired information is accomplished in a variety of fashions. When the desired information is transmitted through a pay-per-view television system, the pay-per-view signal is scrambled in one embodiment, and the viewer receives an unscrambled signal only upon making suitable arrangements for paying the distributor's viewing charge. When the viewer's equipment is in the nature of computer equipment with Internet access, the viewer is prevented from viewing the screen having the camera feed of interest until the viewer makes suitable arrangements for paying the distributor's charge. The distributor optionally supplies the viewer with a password in order to access the pertinent screen.

The invention provides enhanced opportunities for generating advertising revenue. In either the case of pay-per-view television or transmissions delivered through the Internet, the provider adds banner advertising in a preferred embodiment. The advertising is changeable as the motorsports event progresses, and the provider may optionally intersperse information, such as information about the race or about the race participant, in order to keep the viewer's interest. In a still further embodiment, advertising revenue alone will generate sufficient revenue for the provider, such that images will be provided to viewers free of charge.

In a preferred embodiment, the provider will keep track of viewers' requests for camera feed of the motorsports event as a function of the participant of interest. In this way, the provider will be able to tabulate data and identify those participants of greatest interest to viewers. This data allows providers to more accurately associate viewer interest and advertising revenue with individual participants. This, in turn, allows for a more effective way to satisfy viewer interest, compensate participants, and price advertising opportunities.

Numerous deviations from the preferred embodiment described above can be made within the spirit and scope of the invention. It may, for example, become expedient to provide camera feed for only the participants of highest interest. The particular participants for whom camera feed is made available may be determined by the number of viewer requests for such feed, and in an alternative embodiment, the available feeds may change during the event as the level of interest in particular participants ebbs and flows. In such systems, viewers are given the opportunity to switch mid-event between camera feeds of different participants.

The invention is suitable for sporting events other than motorsports events. These events include but are not limited to skiing, sledding events, harness racing, horse racing, football games, and the like. When a sports event consists of a plurality of short sporting events in which the participants are members of competing teams, such as in Olympic and world championship events, the viewer is in one embodiment given the opportunity to select camera feed from a plurality of cameras positioned on or adjacent to participants of a particular team. In a still further embodiment, camera feed of other classes of participants, such as the predicted winners of various events, is provided.

It will be seen that the above system and method enables a sports entertainment viewer the ability to select continuous camera feed of greatest interest and excitement to the viewer, and thus allows the viewer to virtually participate in the event with the participant of greatest interest, experiencing the same track or field conditions of the participant, experiencing the positioning of the participant in relation to other participants, and experiencing the excitement of the event from the perspective of the participant.

I claim:

1. A method for distributing video images and audio signals of a race car competition from the perspective of an individual race participant to one or more individual viewers comprising the steps of
providing each of a plurality of participants in said event with a video camera affixed to the race car and mechanically adjustable to provide a selectable view of the race and a microphone to provide sound, both from that participant's perspective,
providing each of said cameras with a respective transmitter for transmitting information regarding video images and audio generated by the camera and microphone, respectively, which video image and audio reflect the participant's view of the race,
providing retransmission equipment for receiving information transmitted by the transmitter and directing information regarding video images and audio, respectively, from each of the plurality of cameras and microphones to respective channels for remote viewing at a viewer's location,
providing channel selectors that permit viewers at their individual locations to select from among the channels a particular participant's view of the race,
simultaneously operating said cameras during the event so as to generate a plurality of camera and audio feeds during the event, each feed individually reflecting the perspective of the respective participant in real time,
transmitting the plurality of feeds to the retransmitting equipment, and
retransmitting the feeds to said channels, such that each of a plurality of viewers is able to select from a plurality of said channels the perspective of one or more individual participants or a group of participants,
wherein the video images and audio are transmitted by way of a pay-per-view television system or Internet or other computer network and displayed as a single or a plurality of selected images on a split television or monitor screen, based on viewer selection and wherein the view of the camera is selected by a mechanical adjustment by the participant or an outside party.

2. The method of claim 1 wherein the information regarding video images and audio signals is transmitted by way of a pay-per-view television system, and the viewer selects video images and audio signals by selecting a particular pay-per-view channel.

3. The method of claim 1 wherein the information regarding the video images and audio signals is transmitted by way of the Internet and the viewer selects video images and audio signals by operating keys or a mouse of a computer.

4. The method of claim 1 wherein a split television or monitor screen shows a combination of video images from a camera associated with a selected participant and a standard viewing program of the sporting event.

5. The method of claim 1 in which a provider of the images adds advertising to the video information such that the viewer views advertising information along with images of the racing event.

6. The method of claim 5 wherein the provider intersperses information about the racing event or the participant within the advertising information.

7. The method of claim 5 wherein the provider keeps track of viewers' requests for camera feed of the racing event as a function of the participants of interest and uses the resulting information to help satisfy viewer interest, compensate participants, and/or price advertising opportunities.

8. The method of claim 1 in which camera feed is generated for a select group of participants individually, wherein the select group is determined by the number of viewer requests.

9. The method of claim 1 in which a viewer selects camera feed relating to a group of participants, wherein the group consists of participants of a particular team or participants that are predicted winners of the event.

10. A system for distributing from the perspective of an individual participant in a racing event comprising a plurality of video cameras and microphones each mounted on the car of an individual participant in a racing event, a plurality of respective transmitters for transmitting information regarding video images from the plurality of cameras and audio signals from a plurality of microphones, retransmission equipment for receiving information from said transmitters and directing information regarding the video images and audio signals to respective channels for remote viewing and listening at individual viewers' locations, and channel selectors that permit an individual viewer to select from among the channels, thereby allowing the viewers to select and view video images and audio signals from at least one of said cameras and microphones and thereby obtain an individual participant's view of the race, wherein the video images are transmitted by way of a pay-per-view television system, Internet or other computer network and displayed as a single or a plurality of selected images on a split television or monitor screen, based on viewer selection of a single participant or participant group and wherein the camera is affixed to the car and the video image transmitted by the camera is selected by mechanical adjustment of the camera by the race participant or an outside party to provide the participant's view.

* * * * *

UNITED STATES PATENT AND TRADEMARK OFFICE
CERTIFICATE OF CORRECTION

| | | |
|---|---|---|
| PATENT NO. | : 7,106,360 B1 | Page 1 of 1 |
| APPLICATION NO. | : 09/452952 | |
| DATED | : September 12, 2006 | |
| INVENTOR(S) | : Fredrick | |

It is certified that error appears in the above-identified patent and that said Letters Patent is hereby corrected as shown below:

On the title page, in [*] Notice,
delete "568" and insert --59--.

Signed and Sealed this

Twenty-sixth Day of June, 2007

JON W. DUDAS
*Director of the United States Patent and Trademark Office*